United States Patent
Garrett et al.

(10) Patent No.: US 8,036,600 B2
(45) Date of Patent: Oct. 11, 2011

(54) USING A BLUETOOTH CAPABLE MOBILE PHONE TO ACCESS A REMOTE NETWORK

(75) Inventors: Darrin Garrett, Kingston, WA (US); Leon L. Hong, Sammamish, WA (US)

(73) Assignee: Airbiquity, Inc., Seattle, WA (US)

( * ) Notice: Subject to any disclaimer, the term of this patent is extended or adjusted under 35 U.S.C. 154(b) by 0 days.

(21) Appl. No.: 12/752,911

(22) Filed: Apr. 1, 2010

(65) Prior Publication Data
US 2010/0273422 A1 Oct. 28, 2010

Related U.S. Application Data

(60) Provisional application No. 61/173,059, filed on Apr. 27, 2009.

(51) Int. Cl.
*H04B 7/00* (2006.01)
(52) U.S. Cl. ...................................... 455/41.2
(58) Field of Classification Search .................. 455/41.2, 455/41.3, 39; 370/328
See application file for complete search history.

(56) References Cited

U.S. PATENT DOCUMENTS

| | | |
|---|---|---|
| 3,742,463 A | 6/1973 | Haselwood |
| 3,985,965 A | 10/1976 | Field et al. |
| 4,595,950 A | 6/1986 | Lofberg |
| 4,599,583 A | 7/1986 | Shimozono et al. |
| 4,630,301 A | 12/1986 | Hohl |
| 4,685,131 A | 8/1987 | Horne |
| 4,776,003 A | 10/1988 | Harris |
| 4,831,647 A | 5/1989 | D'Avello et al. |
| 4,860,336 A | 8/1989 | D'Avello et al. |
| 4,914,651 A | 4/1990 | Lusignan |
| 4,926,444 A | 5/1990 | Hamilton et al. |
| 4,965,821 A | 10/1990 | Bishop et al. |
| 4,977,609 A | 12/1990 | McClure |
| 5,036,537 A | 7/1991 | Jeffers et al. |
| 5,043,736 A | 8/1991 | Darnell et al. |
| 5,191,611 A | 3/1993 | Lang |

(Continued)

FOREIGN PATENT DOCUMENTS

CA  2242495  1/2000

(Continued)

OTHER PUBLICATIONS

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

(Continued)

*Primary Examiner* — Lewis West
(74) *Attorney, Agent, or Firm* — Stolowitz Ford Cowger LLP (57) ABSTRACT

In one example, a Bluetooth enabled mobile device discovers the Bluetooth profile capability of a plurality of mobile phones and stores the profile information in a database. Thereafter, when access to a remote network such as an Internet Protocol (IP) network is necessitated by an event, the Bluetooth enabled mobile device can establish a Bluetooth connection with an available mobile phone according to a comparison of the event to the stored profile information for that mobile phone. The Bluetooth enabled mobile device can then establish a transport layer connection that extends over the established Bluetooth connection and a wireless telecommunications network associated with the available phone and exchange data with a remote network using the established transport layer connection.

20 Claims, 4 Drawing Sheets

U.S. PATENT DOCUMENTS

| | | |
|---|---|---|
| 5,201,071 A | 4/1993 | Webb |
| 5,208,446 A | 5/1993 | Martinez |
| 5,214,556 A | 5/1993 | Kilbel |
| 5,218,618 A | 6/1993 | Sagey |
| 5,235,633 A | 8/1993 | Dennison et al. |
| 5,272,747 A | 12/1993 | Meads |
| 5,365,450 A | 11/1994 | Schuchman et al. |
| 5,388,147 A | 2/1995 | Grimes |
| 5,396,653 A | 3/1995 | Kivari |
| 5,422,816 A | 6/1995 | Sprague et al. |
| 5,483,549 A | 1/1996 | Weinberg et al. |
| 5,519,403 A | 5/1996 | Bickley et al. |
| 5,539,810 A | 7/1996 | Kennedy, III et al. |
| 5,546,445 A | 8/1996 | Dennison et al. |
| 5,555,286 A | 9/1996 | Tendler |
| 5,572,204 A | 11/1996 | Timm et al. |
| 5,587,715 A | 12/1996 | Lewis |
| RE35,498 E | 4/1997 | Barnard |
| 5,630,206 A | 5/1997 | Urban et al. |
| 5,668,803 A | 9/1997 | Tymes |
| 5,673,305 A | 9/1997 | Ross |
| 5,680,439 A | 10/1997 | Aguilera et al. |
| 5,686,910 A | 11/1997 | Timm et al. |
| 5,687,215 A | 11/1997 | Timm et al. |
| 5,687,216 A | 11/1997 | Svensson |
| 5,691,980 A | 11/1997 | Welles, II |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman et al. |
| 5,726,984 A | 3/1998 | Kubler et al. |
| 5,731,757 A | 3/1998 | Layson, Jr. |
| 5,732,326 A | 3/1998 | Maruyama |
| 5,734,981 A | 3/1998 | Kennedy, III |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler et al. |
| 5,761,204 A | 6/1998 | Grob |
| 5,761,292 A | 6/1998 | Wagner et al. |
| 5,771,001 A | 6/1998 | Cobb |
| 5,771,455 A | 6/1998 | Kennedy, III |
| 5,774,876 A | 6/1998 | Woolley |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott et al. |
| 5,797,091 A | 8/1998 | Clise |
| 5,804,810 A | 9/1998 | Woolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE035,916 E | 10/1998 | Dennison et al. |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley |
| 5,892,454 A | 4/1999 | Schipper |
| 5,901,179 A | 5/1999 | Urabe |
| 5,911,129 A | 6/1999 | Towell |
| 5,912,886 A | 6/1999 | Takahashi |
| 5,913,170 A | 6/1999 | Wortham |
| 5,917,449 A | 6/1999 | Sanderford |
| 5,918,180 A | 6/1999 | Dimino |
| 5,930,340 A | 7/1999 | Bell |
| 5,930,722 A | 7/1999 | Han |
| 5,933,468 A | 8/1999 | Kingdon |
| 5,936,526 A | 8/1999 | Klein |
| 5,937,355 A | 8/1999 | Joong |
| 5,940,598 A | 8/1999 | Strauss |
| 5,945,944 A | 8/1999 | Krasner |
| 5,946,304 A | 8/1999 | Chapman |
| 5,946,611 A | 8/1999 | Dennison et al. |
| 5,949,335 A | 9/1999 | Maynard |
| 5,953,694 A | 9/1999 | Pillekamp |
| 5,960,363 A | 9/1999 | Mizikovsky |
| 5,961,608 A | 10/1999 | Onosaka |
| 5,963,130 A | 10/1999 | Schlager |
| 5,963,134 A | 10/1999 | Bowers |
| 5,970,130 A | 10/1999 | Katko |
| 5,978,676 A | 11/1999 | Guidri |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine |
| 6,014,089 A | 1/2000 | Tracy |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,121,922 A | 9/2000 | Mohan |
| 6,122,271 A | 9/2000 | McDonald |
| 6,122,514 A | 9/2000 | Spaur |
| 6,131,067 A | 10/2000 | Girerd |
| 6,131,366 A | 10/2000 | Fukuda |
| 6,133,874 A | 10/2000 | Krasner |
| 6,140,956 A | 10/2000 | Hillman et al. |
| 6,144,336 A | 11/2000 | Preston et al. |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |

| | | |
|---|---|---|
| 6,195,736 B1 | 2/2001 | Lisle |
| 6,208,959 B1 | 3/2001 | Jonsson |
| 6,212,207 B1 | 4/2001 | Nicholas |
| 6,226,529 B1 | 5/2001 | Bruno et al. |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotchini |
| 6,300,875 B1 | 10/2001 | Schafer |
| 6,301,480 B1 | 10/2001 | Kennedy, III |
| 6,304,186 B1 | 10/2001 | Rabanne |
| 6,304,637 B1 | 10/2001 | Mirasrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,358,145 B1 | 3/2002 | Wong |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III |
| 6,430,176 B1 | 8/2002 | Christie, IV |
| 6,434,198 B1 | 8/2002 | Tarraf |
| 6,466,582 B2 | 10/2002 | Venters |
| 6,470,046 B1 | 10/2002 | Scott |
| 6,477,633 B1 | 11/2002 | Grimmett |
| 6,493,338 B1 | 12/2002 | Preston et al. |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,611,804 B2 | 8/2003 | Dorbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston |
| 6,683,855 B1 | 1/2004 | Bordogna |
| 6,690,681 B1 | 2/2004 | Preston et al. |
| 6,690,922 B1 | 2/2004 | Lindemann |
| 6,697,987 B2 | 2/2004 | Lee |
| 6,700,867 B2 | 3/2004 | Classon |
| 6,747,571 B2 | 6/2004 | Fierro |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay et al. |
| 6,845,153 B2 | 1/2005 | Tiburtius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier et al. |
| 7,221,669 B2 | 5/2007 | Preston |
| 7,269,188 B2 | 9/2007 | Smith |
| 7,283,904 B2 | 10/2007 | Benjamin |
| 7,286,522 B2 | 10/2007 | Preston |
| 7,317,696 B2 | 1/2008 | Preston |
| 7,372,833 B2 | 5/2008 | Kyronaho |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 * | 9/2009 | Holmes ......................... 455/418 |
| 7,593,449 B2 | 9/2009 | Shattil |
| 7,606,555 B2 | 10/2009 | Walsh |
| 7,653,383 B2 | 1/2010 | Natarajan |
| 7,701,954 B2 | 4/2010 | Rabenko |
| 7,856,240 B2 * | 12/2010 | Gunn et al. .................... 455/509 |
| 2002/0111167 A1 | 8/2002 | Nguyen |
| 2002/0122401 A1 | 9/2002 | Xiang |
| 2003/0016639 A1 | 1/2003 | Kransmo |
| 2003/0227939 A1 | 12/2003 | Yukie |
| 2004/0034529 A1 | 2/2004 | Hooper, III |
| 2004/0192345 A1 | 9/2004 | Osborn |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 * | 8/2005 | Sovio et al. ...................... 705/64 |
| 2005/0207511 A1 | 9/2005 | Madhavan |
| 2005/0215228 A1 | 9/2005 | Fostick |
| 2005/0226202 A1 | 10/2005 | Zhang |
| 2006/0171368 A1 | 8/2006 | Moinzadeh et al. |
| 2006/0246910 A1 | 11/2006 | Petermann |
| 2007/0087756 A1 | 4/2007 | Hoffberg |
| 2007/0124625 A1 | 5/2007 | Hassan |
| 2007/0155360 A1 | 7/2007 | An |
| 2007/0211624 A1 * | 9/2007 | Schmidt et al. ............... 370/225 |
| 2007/0258211 A1 | 11/2007 | Chesnutt |
| 2007/0264964 A1 | 11/2007 | Birmingham |
| 2008/0025295 A1 | 1/2008 | Elliott |
| 2008/0039017 A1 * | 2/2008 | Kim .............................. 455/41.2 |
| 2008/0056469 A1 | 3/2008 | Preston |
| 2008/0107094 A1 | 5/2008 | Borella |
| 2008/0132200 A1 | 6/2008 | Shinoda |
| 2008/0143497 A1 | 6/2008 | Wasson |
| 2008/0182570 A1 * | 7/2008 | Kuhl ........................... 455/422.1 |
| 2008/0212820 A1 * | 9/2008 | Park ............................. 381/370 |
| 2008/0266064 A1 | 10/2008 | Curran |
| 2008/0294340 A1 * | 11/2008 | Schmidt et al. ............... 701/213 |
| 2009/0055516 A1 * | 2/2009 | Zhodzishsky ................. 709/220 |
| 2009/0077407 A1 | 3/2009 | Akimoto |
| 2009/0110033 A1 | 4/2009 | Shattil |
| 2009/0265173 A1 | 10/2009 | Madhavan |
| 2009/0298428 A1 * | 12/2009 | Shin ............................ 455/41.2 |
| 2009/0306976 A1 | 12/2009 | Joetta |
| 2010/0211660 A1 | 8/2010 | Kiss |

FOREIGN PATENT DOCUMENTS

| | | |
|---|---|---|
| DE | 4424412 | 1/1996 |
| EP | 0242099 | 10/1987 |
| EP | 0512789 | 11/1992 |
| EP | 0528090 | 2/1993 |
| EP | 0545783 | 6/1993 |
| EP | 0 889 610 A2 | 1/1999 |
| EP | 0 896 442 A1 | 2/1999 |
| EP | 01 950 402 | 12/2004 |
| EP | 1 843 503 A2 | 10/2007 |
| JP | 11109062 | 4/1999 |
| TW | 2010/18163 A | 5/2010 |
| WO | 8912835 | 12/1989 |
| WO | 9521511 | 8/1995 |
| WO | 9618275 | 6/1996 |
| WO | WO 98/34164 A1 | 8/1998 |
| WO | WO 98/34359 A1 | 8/1998 |
| WO | 9853573 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | 9949677 | 9/1999 |
| WO | 0011893 | 3/2000 |

| WO | WO 01/78249 A1 | 10/2001 |
| WO | WO 01/99295 A2 | 12/2001 |
| WO | WO 02/054694 A1 | 7/2002 |
| WO | WO 03/034235 A1 | 4/2003 |
| WO | WO 03/081373 A2 | 10/2003 |
| WO | WO 2009/149356 A2 | 12/2009 |

OTHER PUBLICATIONS

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicluar Technology Conference, 1999. VTC 1999—Fall. IEEE VTS 50th Amsterdam Netherlands Sep. 19-22, 1999. Abstract Secion II.

Feher, Kamilo, "Modems for Emergin Digital Cellular-Mobile Radio System", IEEE Trans. on Vehicular Technology, vol. 40, No. 2, May 1991, pp. 355-365.

Brown et al., "A Reconfigurable Modem for Increased Network Capacity and Video, Voice, and Data Transmission over GSM PCS", IEEE Trans. on Circuits and Systems for Video Technology, vol. 6, No. 2, Apr. 1996, pp. 215-224.

Mueller, A.J. et al., "A DSP Implemented Dual 9600/7200 BPS TCM Modem for Mobile Communications Over FM Voice Radios," Proceedings of the 1997 6th IEEE Pacific Rim Conference on Communications, Computers and Signal Processing, vol. 2, Aug. 20-22, 1997, pp. 758-761, IEEE, New York, New York.

PCT International Search Report dated Nov. 27, 2000 for International Application No. PCT/US00/13288.

* cited by examiner

USING A BLUETOOTH CAPABLE MOBILE PHONE TO ACCESS A REMOTE NETWORK

This application is a non-provisional of U.S. Provisional Application No. 61/173,059 filed on Apr. 27, 2009, entitled: AUTOMATIC GAIN CONTROL IN A PERSONAL NAVIGATION DEVICE which is herein incorporated by reference in its entirety.

COPYRIGHT NOTICE

© 2010 Airbiquity, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Navigation devices (including Personal Navigation Devices (PNDs) and in-car electronic devices) output information to a user based on a location of the navigation devices. These navigation devices generally utilize the Global Positioning System (GPS) to determine the location, and then use speakers and/or displays to output map information, directions, etc.

To continue expanding and/or improving the features provided by navigation devices, there is a need to maximize opportunities for navigation devices to obtain network access, such as to the Internet. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a Bluetooth enabled mobile device discovers the Bluetooth profile capability of a plurality of mobile phones and stores the profile information in a database. Thereafter, when access to a remote network such as an Internet Protocol (IP) network is necessitated by an event, the Bluetooth enabled mobile device can establish a Bluetooth connection with an available mobile phone according to a comparison of the event to the stored profile information for that mobile phone. The Bluetooth enabled mobile device can then establish a transport layer connection that extends over the established Bluetooth connection and a wireless telecommunications network associated with the available phone and exchange data with a remote network using the established transport layer connection. Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
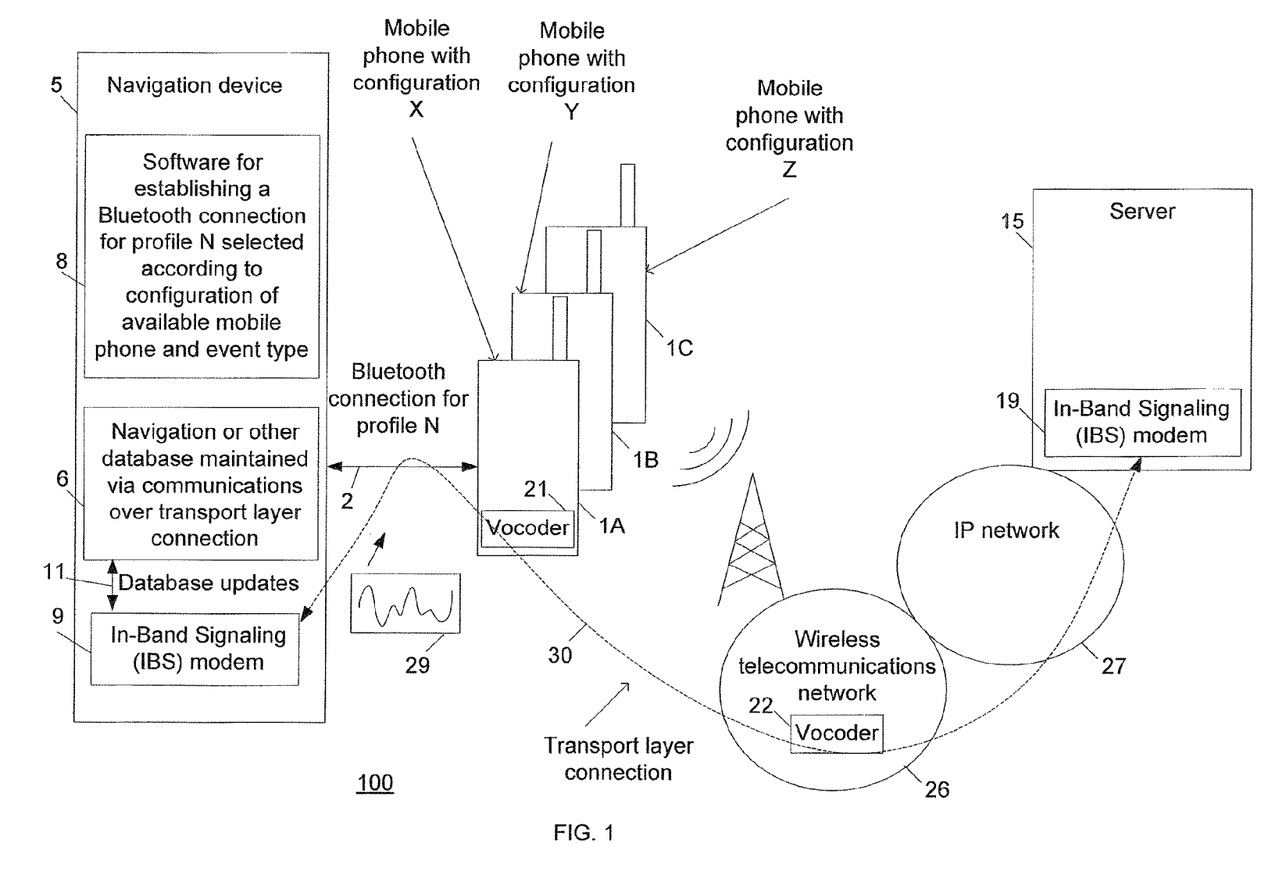
FIG. 1 illustrates a system for accessing a remote server with a navigation device using a Bluetooth capable mobile phone.

FIG. 1 illustrates a system for accessing a remote server with a navigation device using a Bluetooth capable mobile phone.

The system 100 includes a navigation device 5 configured to establish a Bluetooth connection 2 with an available one of the mobile phones 1A-C according to stored profile information for that mobile phone. The navigation device 5 then establishes a transport layer connection to the server 15 (illustrated by the dashed line 30) over the established Bluetooth connection 2, which provides the navigation device with a communication path to the server 15.

In order to maximize the opportunities for the navigation device 5 to communicate with the remote server 15, it is preferable for the navigation device 5 to utilize a mobile phone without regard to whether the mobile phone supports a packet data service connection over its wireless telecommunication network. For example, the illustrated mobile phone 1A does not support a packet data service connection (or, the mobile phone 1A subscriber plan does not include packet data services over the wireless telecommunications network 26), yet the mobile phone 1A can be utilized by the navigation device 5 for Internet Protocol network access, as will be described in the next paragraph.

For this and other reasons, upload communications sent over the Bluetooth connection 2 can be modulated by the In-Band Signaling (IBS) modem 9 for transmission across a voice channel type transport of the wireless telecommunication network. The IBS modem 9 modulates received digital data into audio frequency tones. These frequency tones are selected to synthesize speech so that the frequency tones will pass with minimal attenuation or corruption through a vocoder 21 of the available one of the mobile phones 1A-C and any vocoders 22 in the wireless telecommunication network 26 (other networks between network 26 and the server 15 could operate vocoders as well). Before encoding and modulation into audio tones, the digital data preferably is formatted into one or more packets. A packet formatter may prepend, for example, a header and a sync pattern prior to the payload. Error correction bits, checksums and other enhancements to the packet may be added as well. The navigation device 5 can then transmit the IBS modulated communications 29 over a Bluetooth connection for voice data, to be forwarded over a voice channel of the wireless telecommunications network, through any intervening networks such as the IP network 27, received and demodulated by the IBS modem 19 (recovered into a bitstream), and then finally processed by the server 15. Downloads from the server 15 to the navigation device 5 over the dashed line 30 are likewise modulated by the IBS modem 19 and recovered by the IBS modem 9.

Through this communication exchange 29 over the transport layer connection 30, applications on the navigation device 5 that are part of the navigation system can obtain location-based information in real time can obtain real-time location based information. For example, the navigation device 5 could obtain real-time information about traffic accidents near a current location determined via GPS. The navigation device 5 can also download updates 11 to navigation database 6, e.g. updating a stored map to information about a new route.

Furthermore, any other type of application on the navigation device 5 can also be provided with remotely stored data over the Bluetooth connection 2 and through the wireless telecommunications network 26. This allows the feature set of the navigation device 5 to be expanded to other applications not necessarily related to navigation. For example, an application on the navigation device 5 could be used to obtain stock quotes or other information available via the Internet over the Bluetooth connection 2. It should be understood it is possible for any type of application operating on the navigation device 5 to obtain access to any type of network over the Bluetooth connection 2 as well.

It should be apparent that these real-time information and network services described above can be accessed by the navigation device 5 without burdening the navigation device 5 with expensive satellite transceivers or other specialized transceivers that are generally more expensive and less compact than Bluetooth transceivers. Furthermore, it should be apparent that the operation of the navigation device 5 is not limited to mobile phones that support packet data service connections over their wireless telecommunication networks (such mobile phones are generally expensive to purchase and operate and in any case are not yet used ubiquitously).

It should be understood that communication between the navigation device 5 and the server 15 can bypass the IBS 9 and 19 in certain circumstances. For example, certain Bluetooth capable mobile phones support a high bandwidth packet data service connection over the wireless telecommunications network 26. When such a mobile phone is available, as will be described in detail later, the navigation device 5 establishes the Bluetooth connection 2 with different characteristics so that data sent to the mobile phone triggers utilization of a packet data service connection. The high bandwidth provided by a packet data service is particularly useful if Internet access (such as web mail access) is needed for the navigation device 5.

What follows in the next three paragraphs is a description of the system 100 including a high level overview of the operations of the navigation device 5 having the software 8. Thereafter, with reference to FIGS. 2-3, a more detailed example of the navigation device 5 is provided.

Referring still to FIG. 1, the navigation device 5 learns the configurations X-Z of a plurality of mobile phones 1A-C that the navigation device 5 pairs with over time. The configurations X-Z correspond to the respective software and/or hardware capabilities of the mobile phones 1A-C including which Bluetooth profiles are supported by each mobile phone 1A-C. A Bluetooth profile is a wireless interface specification for Bluetooth-based communication that rides on top of the Bluetooth Core Specification. The configurations X-Z can indicate other software and/or hardware capabilities of the mobile phones 1A-C such as whether the mobile phone supports a packet data service connection over its wireless telecommunications network.

The software 8 stores this learned configuration information as it is obtained for subsequent analysis upon detecting a trigger event. A trigger event could be initiated by an application on the navigation device 5 (such as when a program operating on the navigation device 5 requests data available remotely) or initiated by from a user interface of the navigation device 5 (such as when a user presses a button on the navigation device 5).

When a trigger event is detected, the software 8 identifies an available mobile phone and classifies the trigger event by type. The software 8 then establishes a Bluetooth connection 2 with the available one of the mobile phones 1A-C. The Bluetooth connection 2 utilizes a profile N that is selected based on the known configuration X-Z of the available one of the mobile phones and the classified event type. The profile N can be a profile for transmitting voice data when the communications will be modulated into the frequency tones, as will be described later in greater detail. This profile N will be a different Bluetooth profile when the communications are packet data.

Transmission over the transport layer connection 30 can be tuned using the principles described in U.S. patent application Ser. No. 12/752,999 TBD; "AUTOMATIC GAIN CONTROL IN A PERSONAL NAVIGATION DEVICE", which is herein incorporated by reference in its entirety for all purposes. It should be understood that such tuning is entirely optional.

Figure 2:
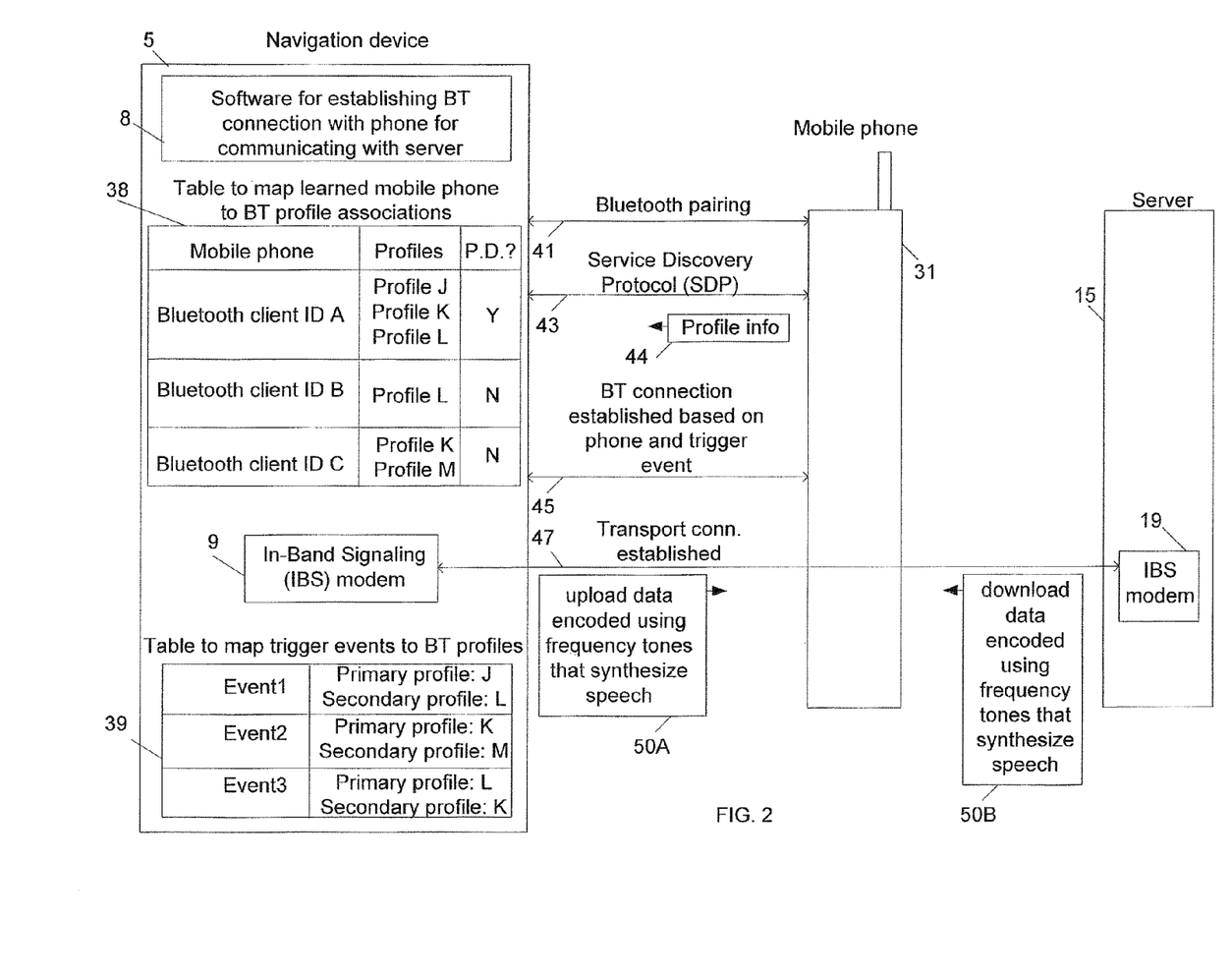
FIG. 2 illustrates the navigation device shown in FIG. 1 as well as interactions between the navigation device and other devices.

FIG. 2 illustrates the navigation device shown in FIG. 1 as well as interactions between the navigation device and other devices.

The navigation device 5 includes a table 38 to map learned mobile phone-to-Bluetooth profile associations. The table 38 is stored in a memory of the navigation device 5 and includes an entry for each mobile phone the navigation device 5 has paired with. Each entry identifies the respective mobile phone using any identifier for the mobile phone, such as a Bluetooth client identifier A-C identified during pairing 41. Each entry in the table 38 also lists Bluetooth profiles, e.g. J, K, L or M, supported by the corresponding mobile phone as discovered during a Service Discovery Protocol (SDP) 43 or similar exchange to obtain the profile information 44. Each entry in the table 38 can also indicate whether or not the corresponding mobile phone supports a packet data service connection over its wireless telecommunications network, which could be determined by the navigation device 5 using any known method including, but not limited to, a trial and error type learning process.

Upon detecting a trigger event, the software 8 compares the trigger event to the table 39 that maps known trigger events to known Bluetooth profiles. The entries in the table 39 can be predetermined prior to the navigation device 5 pairing with any mobile phones, and possibly updated from time to time as initiated by the server 15 or the navigation device 5.

Also, the profile(s) associated with each event can be ranked in table 39 according to correspondence with the trigger event. For example, for events requiring a relatively large file size transfer, e.g. downloading a picture, a primary profile could include a Basic Imaging Profile (BIP). A secondary profile could include a Hands-Free Profile (HFP), which would enable the picture to be downloaded in the form of synthesized speech and then recovered via demodulation. For events requiring a relatively small file size transfer, e.g. flight information, a primary profile could include any Bluetooth profile for sending text messages. A secondary profile could include the HFP, which would enable the flight information to be downloaded in the form of synthesized speech and then recovered via demodulation. The ranking can be predetermined prior to the navigation device pairing with any mobile phones, and subsequently adjusted at any time.

Several factors may be used to rank known Bluetooth profiles for each event type. Such factors include the cost of in-band communications versus packet data communications, application requirements such as whether the trigger event is a high or low bandwidth application, or any other factors. The ranking could be dynamically adjusted to take into account a user's preference, for example, if the user indicates that a connection is too slow the rankings could be adjusted. Also, certain mobile phones store manufacturer specifications for user experience, which could be accessed by the navigation device 5 and also used to dynamically adjust the rankings depending on which mobile phone is currently utilized.

The comparison of the trigger event to the table 39 identifies a ranked subset of the Bluetooth profiles. These identified ranked profiles are then compared to the table 38 entry that corresponds to the available phone. The highest ranked profile existing in the relevant table 38 entry is used to establish the Bluetooth connection in process 45.

It should be understood that certain ones of supported Bluetooth profiles discovered using the SDP 43 may be excluded from the comparison described in the previous paragraph based on whether the corresponding mobile phone supports a packet data service connection (the far right column of the table). For example, if the mobile phone does not support a packet data service connection, then certain Bluetooth profiles, e.g. Basic Imaging Profile (BIP), may be excluded from the comparison even if the mobile phone supports this Bluetooth profile. This is to prevent the navigation device 5 from sending data to the mobile phone 31 in a format that the mobile phone 31 cannot communicate over its wireless telecommunication network.

Having established the Bluetooth connection in process 45, the navigation device 5 can communicate with the remote server 15 in process 47. As discussed previously, uploads 50A and downloads 50B can be modulated as frequency tones synthesizing speech to pass over a voice channel in the wireless telecommunications network using the IBS modems 9 and 19. If sent over a Bluetooth connection for voice data as discussed above, these uploads 50A and downloads 50B will be passed through by the mobile phone 31 regardless of whether the mobile phone 31 is aware that the uploads 50A and downloads 50B do not represent actual speech. If the mobile phone i31 s capable of establishing a packet data service connection over its telecommunication network, as discussed previously, such modulation may be bypassed.

In either case, a transport layer connection is established between the navigation device 5 and the remote server 15. Underlying this transport layer connection is a plurality of lower layer connections, for example the Bluetooth connection between the navigation device 5 and the mobile phone 31, and one or more lower layer connections to connect the mobile phone 31 the remote server 15. The application layer rides on top of this transport layer connection.

Figure 3:
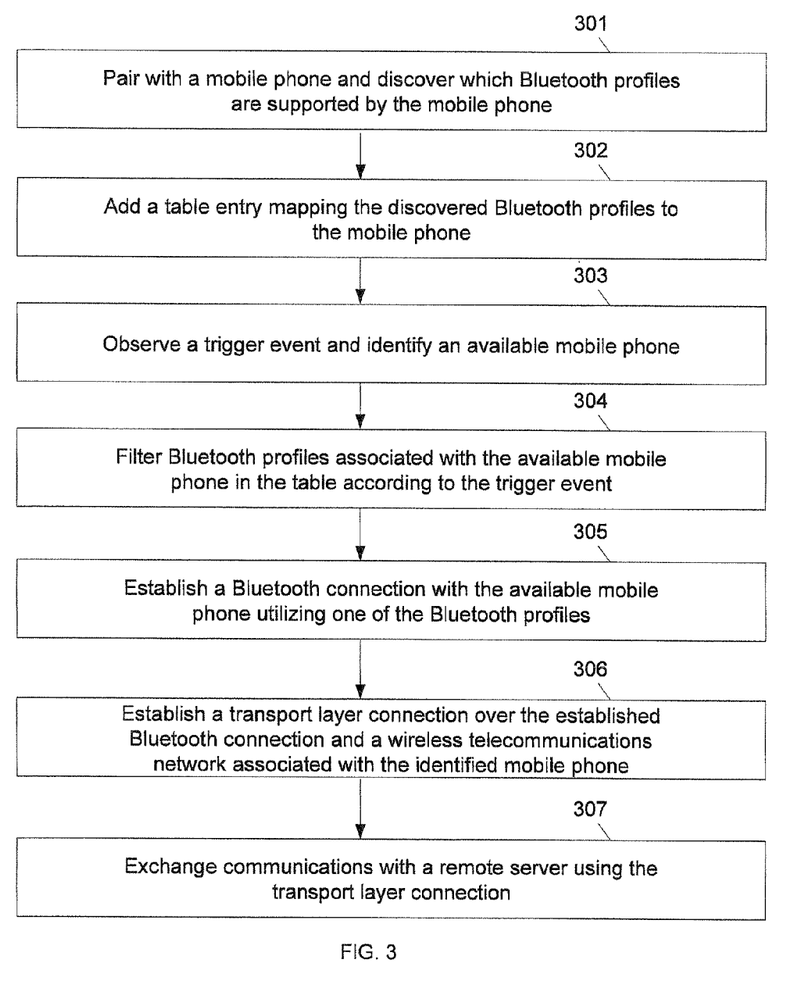
FIG. 3 illustrates how the navigation device shown in FIGS. 1 and 2 accesses the remote server.

FIG. 3 illustrates how the navigation device shown in FIGS. 1 and 2 communicates with the remote server.

In block 301, the navigation device 5 pairs with a mobile phone and discovers which Bluetooth profiles are supported by the mobile phone. The navigation device 5 adds a table entry mapping the discovered Bluetooth profiles to the mobile phone in block 302.

In block 303, the navigation device 5 observes a trigger event and identifies an available phone. In block 304, the navigation device 5 filters Bluetooth profiles associated with the available mobile phone in the table according to the trigger event. This process 304 may or may not include comparing the associated profiles to a ranked listing of Bluetooth profiles for the type of trigger event. The process 304 may or may not include determining whether the available mobile phone supports packet data service connections and filtering the associated profiles accordingly.

In block 305, the navigation device 5 establishes a Bluetooth connection with the available mobile phone utilizing one of the filtered Bluetooth profiles. In block 306, the navigation device 5 establishes a transport layer connection over the established Bluetooth connection and a wireless telecommunications network associated with the identified available mobile phone. In block 307, the navigation device exchanges communications with a remote network using the transport layer connection.

As discussed previously, in one example the transport layer connection can be selected from at least a voice channel and a packet data connection to maximize transmission opportunities with a wide variety of mobile phones. If a voice channel is selected for the transport layer connection, an in-band signaling modem is used for the communication exchange.

Figure 4:
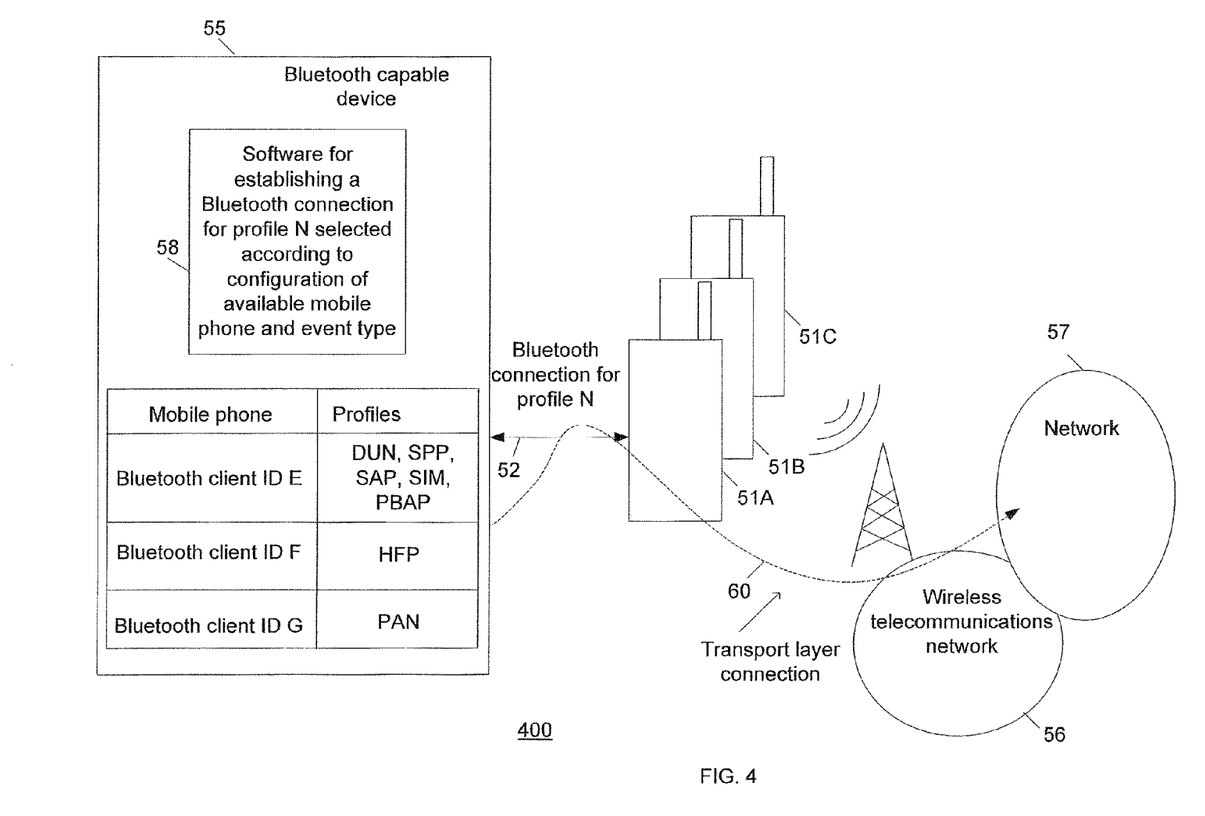
FIG. 4 illustrates a system for accessing a remote server with a Bluetooth capable device using a mobile phone.

FIG. 4 illustrates a system for accessing a remote server with a Bluetooth capable device using a mobile phone.

The principles discussed previously can be applied in other examples besides the example discussed with reference to FIGS. 1-3. For example, the example system 400 includes a Bluetooth capable device 55 encoded with software 58 that is configured to establish a Bluetooth connection 52 with an available one of the mobile phones 51A-C. The established Bluetooth connection 52 provides the device 55 with a communication path to the remote network 57, as illustrated by the dashed line 60.

The Bluetooth capable device 55 can be any type of device and in any case is not limited to a device configured for navigation. For example, the device 55 can be a Telematic Control Unit (TCU), a Hands Free Kit (HFK), an in-dash car entertainment system (regardless of whether the in-dash entertainment system has any navigation capability), etc. The principles described herein can be applied to Bluetooth capable devices regardless of whether such devices include an LBS.

The transport layer connection 60 can be any type of transport layer connection and in any case is not limited to an in-band connection. For example, the transport layer connection 60 can any known transport used in any type of network such as a circuit switched network or a packet switched network. The transport layer connection 60 can extend through a gateway operating between the wireless telecommunications network 56 and another network 57, as shown in the figure. The transport layer connection 60 may not extend through such a gateway in other examples but may extend only to a device operating within the wireless communication network 56 of the mobile phone. The transport layer connection 60 could even extend from the device 55, through the mobile phone 51A, to another Bluetooth capable device in communication with the mobile phone 51A.

As indicated in the previous two paragraphs, the transport layer connection can be established with any type of network device and need not terminate on an in-band signaling server. The principles described herein can be applied regardless of whether the system 400 includes an in-band server (or any other device containing an IBS modem for that matter).

As indicated by the variable N, the Bluetooth connection 52 can be established using any profile that is supported by the available mobile phone. As previously discussed, mobile phones often contain more than one Bluetooth profile and in this case the Bluetooth profile N used to establish the Bluetooth connection N is preferably established according to the transport layer connection to be used (which as previously discussed can be indicated by the trigger event type). For example, if the transport layer connection is a packet data transport (including transports associated with circuit switched networks), then N can be, for example, Dial-Up Networking (DUN). If the transport layer connection is an Short Message Service (SMS) transport, then N can be, for example, DUN, HFP, Serial Port Profile (SPP), Subscriber Identity Module (SIM), SIM Access Profile (SAP), or Phone Book Access Profile (PBAP). If the transport layer connection is a transport used in Bluetooth area networks (between the mobile phone 51A and another Bluetooth device), then N can be, for example, Personal Area Network (PAN). These examples are intended to be illustrative, not exhaustive.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical navigation device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A processor readable medium encoded with instructions that, if executed, result in:
   pairing a navigation device with a mobile phone and discovering which Bluetooth profiles are supported by the mobile phone;
   mapping an identifier for the mobile phone to the supported Bluetooth profiles in a memory of the navigation device;
   filtering the Bluetooth profiles that are mapped in the memory according to a trigger event;
   establishing a Bluetooth connection between the navigation device and the mobile phone utilizing one of the filtered Bluetooth profiles;
   establishing a voice channel type transport layer connection over the established Bluetooth connection and a wireless telecommunications network associated with the mobile phone; and
   modulating a received digital bitstream into an upload continuous audio signal that has different frequency tones for different bit values or demodulating a received download continuous audio signal that has the different frequency tones, wherein the frequency tones are selected to pass through a wireless voice channel of the wireless telecommunications network unobstructed by vocoders operating within the wireless telecommunications network, and wherein the upload or download continuous audio signal is to be communicated to or from a remote server over the established transport layer connection.

2. The processor readable medium of claim 1, wherein the mapping is stored in an entry in the navigation device memory, and the instructions, if executed, result in:
   whenever the navigation device is paired with a new mobile phone, discovering which Bluetooth profiles are supported by the new mobile phone; and
   adding a new entry in the navigation device memory for the new mobile phone, the new entry mapping an identifier for the new mobile phone with the discovered Bluetooth profiles associated with the new mobile phone.

3. The processor readable medium of claim 2, wherein the instructions, if executed, result in:
   establishing a Bluetooth connection with a currently available one of the mobile phones, the Bluetooth connection established by selecting from Bluetooth profiles associated with the currently available mobile phone in the navigation device memory;
   establishing the Bluetooth connection according to the selected Bluetooth profile; and
   uploading or downloading information to or from the remote server using the established Bluetooth connection.

4. The processor readable medium of claim 1, wherein the established Bluetooth connection comprises one of a plurality of lower layer connections enabling the transport layer connection between the navigation device and the remote server.

5. The processor readable medium of claim 4, wherein another one of the lower layer connections include a lower layer connection extending from the mobile phone and through the wireless telecommunications network.

6. The processor readable medium of claim 1, wherein the navigation device memory stores a table mapping trigger event types to Bluetooth profiles, and the instructions, if executed, result in:

comparing the trigger event to the trigger event types in the table to identify a Bluetooth profile ranking; and filtering the discovered Bluetooth profiles using the identified Bluetooth profile ranking.

7. The processor readable medium of claim 6, wherein the instructions, if executed, result in:

if an attempt to establish the Bluetooth connection using the highest ranked filtered Bluetooth profile fails, attempting to establish the Bluetooth connection using the next highest ranked filtered Bluetooth profile.

8. A method, comprising:

storing an identifier for a mobile phone in a memory of a Bluetooth capable device;

using the Bluetooth capable device, pairing with the mobile phone and discovering which Bluetooth profiles are supported by the mobile phone;

storing an indication for each of the supported Bluetooth profiles in the memory of the Bluetooth capable device, wherein the stored indications for the supported Bluetooth profiles are correlated to the stored identifier for the mobile phone in the memory of the Bluetooth capable device;

in response to a trigger event, identifying an available mobile phone and comparing an identifier for the available mobile phone to the memory of the Bluetooth capable device;

filtering Bluetooth profiles that are identified by the comparison according to the trigger event;

establishing a Bluetooth connection between the Bluetooth capable device and the mobile phone utilizing one of the filtered Bluetooth profiles;

establishing a transport layer connection that extends over the established Bluetooth connection and a wireless telecommunications network corresponding to the mobile phone; and exchanging communications between the Bluetooth capable device and a remote network over the established transport layer connection.

9. The method of claim 8, further comprising:

determining whether the mobile phone is capable of conducting a packet data service connection over the wireless telecommunications network;

if the packet data service connection is not enabled, modulating a received digital bitstream into an upload continuous audio signal that has different frequency tones for different bit values or demodulating a received download continuous audio signal that has the different frequency tones using an in-band signaling modem, wherein the frequency tones are selected to pass through a wireless voice channel of the wireless telecommunications network unobstructed by vocoders operating within the wireless telecommunications network, and wherein the upload or download continuous audio signal is to be communicated to or from a remote server over the established Bluetooth connection; and if the packet data service connection is enabled, exchanging information with the remote server independently of the in-band signaling modem.

10. The method of claim 8, wherein the instructions, if executed, result in:

comparing the trigger event to a table mapping trigger event types to Bluetooth profiles; and filtering the Bluetooth profiles that are mapped in the memory according to a result of the comparison.

11. The method of claim 10, wherein the filtering identifies a primary Bluetooth profile and a secondary Bluetooth profile.

12. A Bluetooth capable device encoded with instructions that, if executed, result in:

pairing with a mobile phone and discovering which Bluetooth profiles are supported by the mobile phone;

mapping an identifier for the mobile phone to the supported Bluetooth profiles in a memory of the Bluetooth capable device;

filtering the Bluetooth profiles that are mapped in the Bluetooth capable device memory according to a trigger event;

establishing a Bluetooth connection with the mobile phone utilizing one of the filtered Bluetooth profiles;

establishing a transport layer connection that extends over the Bluetooth connection and a wireless transport network corresponding to the mobile phone; and receiving or transmitting communications from the Bluetooth capable device to a remote network over the established transport layer connection.

13. The Bluetooth capable device of claim 12, wherein the instructions, if executed, result in:

establishing the Bluetooth connection using a Bluetooth profile for voice data according to whether the mobile phone is capable of establishing a packet data type transport connection over the network.

14. The Bluetooth capable device of claim 12, wherein the instructions, if executed, result in:

whenever the Bluetooth capable device is paired with a new mobile phone, discovering which Bluetooth profiles are supported by the new mobile phone; and adding a new entry in the Bluetooth capable device memory for the new mobile phone, the new entry mapping an identifier for the new mobile phone with the discovered Bluetooth profiles associated with the new mobile phone.

15. The Bluetooth capable device of claim 14, wherein the instructions, if executed, result in:

establishing a Bluetooth connection with a currently available one of the mobile phones, the Bluetooth connection established by selecting from Bluetooth profiles associated with the currently available mobile phone in the Bluetooth capable device memory;

establishing the Bluetooth connection according to the selected Bluetooth profile; and uploading or downloading the information to or from a remote server using the established Bluetooth connection.

16. The Bluetooth capable device of claim 12, wherein the instructions, if executed, result in:

determining whether the mobile phone supports a packet data service connection over the network; and filtering the Bluetooth profiles that are mapped in the Bluetooth capable device memory according to the determination.

17. The Bluetooth capable device of claim 12, wherein the instructions, if executed, result in:

comparing the trigger event to a table that maps trigger events to Bluetooth profiles;

identifying a subset of the Bluetooth profiles according to the comparison; and filtering the Bluetooth profiles indicated in the Bluetooth capable device memory as being supported by the mobile phone using the identified subset.

18. The Bluetooth capable device of claim 17, wherein the instructions, if executed, result in:

identifying a ranked subset of the Bluetooth profiles according to the comparison; and filtering the Bluetooth profiles indicated in the Bluetooth capable device memory as being supported by the mobile phone using the identified ranked subset.

19. The Bluetooth capable device of claim 12, wherein the trigger event corresponds to an input received over a user interface of the Bluetooth capable device.

20. The Bluetooth capable device of claim 12, wherein the trigger event is generated independently of any input received over a user interface of the Bluetooth capable device.

* * * * *